May 31, 1966 | L. FREIMANIS ETAL | 3,254,327

SEQUENTIAL MAGNETIC DEVICES

Filed Dec. 27, 1962

| | INTERVALS A | B | C | D |
|---|---|---|---|---|
| FIELD DIRECTIONS | CELL RESET | DURING ST. PULSE | CELL SET | DURING RST. PULSE |
| DUE TO PULSE CURRENT | — | ↑ | — | ↓ |
| IN SLEEVE | ↓ | ↑ | ↑ | ↓ |
| IN SWINGER | ↑ | ↑ | ↓ | ↓ |

INVENTORS L. FREIMANIS
P. G. RIDINGER
BY
S E Hollander
ATTORNEY

United States Patent Office 3,254,327

Patented May 31, 1966

3,254,327

SEQUENTIAL MAGNETIC DEVICES

Laimons Freimanis, East Orange, and Philip G. Ridinger, Colts Neck, N.J., assignors to Bell Telephone Laboratories Incorporated, New York, N.Y., a corporation of New York Filed Dec. 27, 1962, Ser. No. 247,626

12 Claims. (Cl. 340—147)

This invention relates to sequential magnetic circuits and elements therefor, and more particularly, to such elements whose operation is independent of the duration of the controlling input signals.

With the higher speeds of operation that have become increasingly prevalent in present day circuits and systems, new and more efficient circuit components have been concurrently developed to keep pace with this ever-expanding need. With the advent of such new components, transitional elements have been developed for situations where a certain degree of compatibility between the older and slower systems and the newer more rapid systems is required.

For example, the use of magnetic cores in various counting and switching applications has become quite frequent, such cores being adequately responsive to the high speed signals often encountered in contemporary switching arrangements. However, the readout circuitry attendant upon such magnetic core arrangements is usually quite extensive and must be carefully designed in most cases in order to avoid disturbing the remanent magnetic state of the core during the process of reading out.

A further commercially acceptable development along the lines mentioned supra is the ferreed element of Patent 2,995,637 of Feiner-Lovell-Lowry-Ridinger, issued August 8, 1961. The ferreed is a device which is able to provide for receiving high speed electronic control signals which are effective to control the magnetization of the remanent material in the structure, with sealed reed switches operating in response to changes in state of the associated portions of the remanently magnetic material. The ferreed may advantageously be utilized as a crosspoint device such as that shown in T. N. Lowry Patent 3,073,085, issued May 29, 1962, or as a sequential circuit element as disclosed in the two copending P. G. Ridinger applications Serial No. 247,679, and Serial No. 247,757, filed on even date herewith.

While the various ferreed structures and arrangements so far disclosed are fully operative and satisfactory for the purposes to which they have been applied, certain basic problems have arisen whose elimination would appear to be desirable. In the first place, many of the priorly cited circuit arrangements utilize separate contacts to perform different required circuit operations. Although this assuredly makes for reliable circuit operation, any practicable reduction in the number of contacts used can be thought of as providing apparent economic advantages.

In this regard, certain prior art arrangements utilizing contacts to steer heavy pulse currents operated so as to interrupt the circuit while such curents were still flowing. This effect, although undesirable, was often unavoidable in these prior art structures, thereby tending to reduce both the efficiency and the operational life of the contacts.

Moreover, other prior art devices were extremely restricted by their basic dependence on the duration of their input signals. Input pulse width requirements, for example, became highly critical limitations on the operability of these devices. A related difficulty was the initiation of contact movement in response to the leading edge of input pulses, often causing mutilation of these and other pulses. With ferreeds, this problem may be said to be especially acute, since it is often desirable to take advantage of the inherent delay in operation of the reed switch contacts in response to the establishment of magnetic states in the remanent material. For example, in FIG. 6 of a copending P. G. Ridinger application, Serial No. 247,757, cited supra, contacts responsive to magnetic changes in one stage of a sequential circuit steer pulses to change the state of both that stage and the succeeding stage. While this arrangement is wholly operative, pulse width must be restricted to a relatively low value if breaking of pulse current with the attendant contact wear is to be avoided. That is, suppose contacts responsive to changes in magnetic state of a stage 1 are steering an input pulse from an exciting winding in stage 1 to a similar winding in a succeeding stage 2; if it is assumed that the pulse through stage 1 is adapted to release the stage 1 contacts within 20 microseconds, the input pulse must be arbitrarily restricted to a lesser time duration or breaking of pulse current (and contact erosion) will result.

By virtue of the present arrangement, the contacts of stage 1 will not begin to release until the termination of the input pulse. Consequently if the input pulse exceeds 20 microseconds (and is for example 800 microseconds), no breaking of pulse current is possible, thereby eliminating the arbitrary restriction imposed by prior art arrangements.

It is therefore an object of this invention to provide an improved magnetically responsive switching element.

It is a further object of this invention to provide a switching element which combines the high speed response of remanently magnetic material with reliable contact switching.

Another object of this invention is the provision of a switching element whose contact operation is independent of the duration of the controlling input signals.

Still another object of this invention is to furnish a magnetic switching element which can accomplish both high speed memory functions and reliable pulse gating through the use of a single transfer contact per element.

A further object of this invention is to provide a switching element the operational life of which will not be curtailed by normal circuit operation.

In one illustrative embodiment of the principles of this invention, an element to be denominated herein as a "transferreed" is disclosed. The development of such a name comes from the combination of the words "transfer," relating to the transfer contacts of the element, and "ferreed," referring to the patent cited supra. The element herein disclosed comprises a sealed magnetically polarized switch surrounded by a sleeve of remanently magnetic material. Enclosing the sleeve is a plurality of exciting windings through which input signals are arranged to pass. A magnetically soft conductive swinger within the polarized switch is so disposed as to rest against either of two oppositely polarized permanent magnet pole pieces depending upon the controlling direction of magnetization established in the element; the swinger also acts to steer input signals to the appropriate winding when it is resting against either of the two pole pieces.

When an input signal excites one of the above-mentioned windings, the dominant electromagnetic field thereby established controls the direction of magnetization in the sleeve; it also controls the direction of magnetization in the swinger, but only during the time interval of the exciting signal. After such a signal has terminated, the flow of magnetic flux from the remanent sleeve through the soft magnetic swinger replaces the priorly dominant field and reverses the swinger's magnetizaiton direction. This reversal establishes a magnetic pole in the swinger which is of the same polarity as that of the pole piece against which the swinger priorly rested, the magnetic repulsion thereby causing the swinger to switch its position and rest against the other pole piece. It can thus be seen that the logical action represented by the movement of the swinger from one pole piece to the other will not commence until an input signal has terminated, so that should the input signal be a pulse, the trailing edge thereof will be effective to initiate the movement of the swinger. Under these circumstances, the switching action of the transferreed is seen to this extent to be independent of the duration of the input signal.

A feature of this invention is an improved switching element with means for controlling its switching action by a single transfer contact.

Another feature of this invention includes facilities for commencing a switching element's logical action only after the termination of an input signal.

An additional feature of this invention is means for furnishing an output indication of a switching element's state using only a single transfer contact also utilized for steering input signals to the element's windings.

These and other objects and features of this invention will become apparent when taken in conjunction with the specification, the appended claims, and the attached drawing in which:

FIG. 3 is a symbolic representation of the element of FIG. 1; and

FIG. 4 indicates the arrangement by which the switching element which is symbolically shown in FIG. 3 may provide an output indication through the use of only a single transfer contact where the contact is also used for steering purposes.

Figure 1:
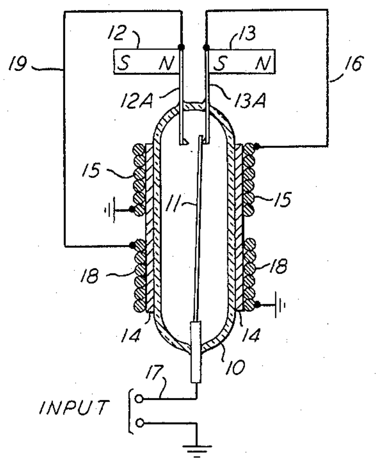
FIG. 1 is a physical representation of a switching element embodying the principles of this invention.

Referring initially to FIG. 1, a transferreed binary cell is physically represented therein. The basic elements of the transferreed itself are as follows:

A sealed envelope 10 enclosing a swinger or commutator 11 of "soft" magnetic material, that is, material having a low coercivity; two polarizing magnets 12 and 13 arranged to exert magnetic force symmetrically about the swinger 11 so that the swinger may rest against either pole piece 12A or 13A depending upon the electromagnetic field considerations to be discussed infra—it is apparent that permanent magnets 12 and 13 are merely shown for illustrative purposes, and that the invention is not intended to be limited to that specific arrangement for providing a magnetic field at the upper portion of the envelope 10; sleeve 14 cylindrically disposed around the envelope 10—the sleeve 14 is composed of remanent magnetic material having a substantially square hysteresis loop well known in the art; set winding 15 enclosing both the remnant sleeve 14 and the envelope 10, and arranged to receive input pulse signals on conductor 16 after such signals have passed through the swinger 11 and the pole piece 13A from input lead 17; and reset winding 18 circularly surrounding both the remanent sleeve 14 and the envelope 10, and arranged to receive input signals on lead 19 after such signals have been transmitted from input lead 17 through the swinger 11 and the pole piece 12A when the swinger rests against that pole piece (the position which is the complement of that actually shown in FIG. 1). Although windings 15 and 18 are shown separated in FIG. 1 for reasons of clarity, those skilled in the art will recognize numerous equivalent wiring arrangements which are within the purview of this invention; it is to be understood that such windings should be uniformly distributed along the length of the sleeve for proper operation.

It is obvious to those skilled in the art that the transferreed may utilize a switch of the type well known in the art as a sealed reed mercury switch.

The physical embodiment of the transferreed binary cell shown in FIG. 1 is essentially a cut-away or section view, so that the set winding 15 is shown therein in two portions which actually surround the envelope 10 and the similarly doubly shown remanent sleeve 14. References hereinafter to the clockwise and counterclockwise directions of pulsing of the windings 15 and 18 will be taken as though the cell of FIG. 1 were being regarded from a top view. The state shown in FIG. 1 will be herein denominated as the "reset" condition, while the state wherein the swinger 11 shifts position and rests against pole piece 12A instead of 13A, will be denominated as the "set" condition. Let it further be assumed, in order to facilitate the analysis of the magnetic characteristics of the circuit, that magnetic lines of flux proceed from a south pole to a north pole within a magnetic material, and from a north pole to a south pole external to the magnetic material.

With the transferreed binary cell of FIG. 1 shown therein in what has been denominated as the reset condition, a complete switching cycle proceeding through the set condition and back to the reset condition will now be described. To provide a fuller comprehension of the operation of the cell during this cycle, it will be helpful to refer to FIG. 2 of the attached drawing which indicates through the use of vertically oriented arrows the direction of the magnetic field in the critical elements of the cell at four discrete time intervals.

Figure 2:
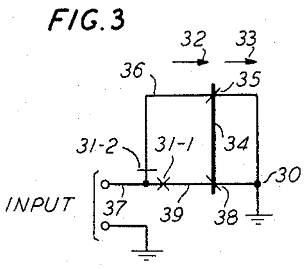
FIG. 2 is a table of the directions of fields established in specific portions of the switching element of FIG. 1 during certain critical intervals.
Figure 2:
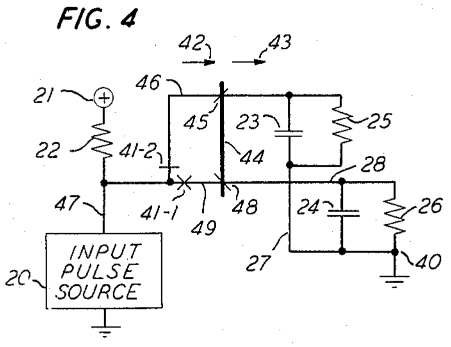

At the end of the previous switching cycle, the magnetic fields in the remanent sleeve 14 and in the swinger 11 interact as follows to cause the swinger to be positioned against pole piece 13A; the direction of magnetization in the remanent sleeve 14 is in the downward direction, and by the flow of magnetic flux from the sleeve 14 to the swinger 11 in a well-known manner, the magetization direction in the swinger 11 can readily be seen to be in the upward direction as shown in column A of FIG. 2. The swinger 11, then acting as a magnetic member, has lines of magnetic flux oriented upward, or from a south pole to a north pole in the swinger according to the assumption supra. Thus, a north magnetic pole exists at the upper end of the swinger 11, and with the magnet 13 having its south pole positioned near the swinger, the swinger is attracted to and makes contact with the pole piece 13A.

Therefore, when an initial pulse signal appears on input lead 17, it is transmitted through the nonremanent, though conductive swinger 11, and via pole piece 13A to conductor 16 and to set winding 15. Set winding 15 is connected so that pulse current will pass, when regarding the transferreed from above as mentioned supra, in a counterclockwise direction. That is, the pulse current would tend to emerge from the left-hand coils of winding 15 shown in FIG. 1, and re-enter the drawing through the right-hand coils of winding 15 shown in FIG. 1. Applying the well-known right-hand rule, we see that the direction of the magnetic field created by pulse current passing through the set winding 15 when the swinger 11 rests against pole piece 13A is in the upward direction, as shown in the first row of column B in FIG. 2.

For the duration of the set pulse, the directions of magnetization in both the remanent sleeve 14 and the nonremanent swinger 11 are controlled by the direction of the electromagnetic field established by the set pulse current through the set winding 15, as indicated supra. Since it has been mentioned that the field direction due to the set pulse current is in the upward direction, it therefore follows that the magnetization directions in both the remanent sleeve 14 and in the swinger 11 will also be upward, the magnetization direction in the sleeve 14 having been reversed by the presence of the set pulse current (compare column B with column A in FIG. 2). The return path for the magnetic flux in this situation is substantially through the surrounding air.

It can be seen that the flow of magnetic lines of flux within the swinger 11 has not yet changed in response to any other field established around it; a north magnetic pole therefore still remains at the upper end of the swinger 11 and the swinger is still thereby attracted to the polarizing magnet 13 as shown in FIG. 1. After the set pulse has terminated, however, magnetization direction changes which will affect the logical switching action of the transferreed binary cell shown in FIG. 1 begin to occur. The resultant relationships are indicated in column C of FIG. 2. It is seen that after the set pulse has terminated, the magnetization direction in the remanent sleeve 14 governs the field direction in the swinger 11 through the well-known flow of magnetic flux through the remanent sleeve 14 in the upward direction and thence to the swinger 11, passing through the swinger in the downward direction. Based once again on the priorly made assumptions with regard to the creation of magnetic poles, it can be noted that the downward flow of magnetic flux within the swinger 11 which is now acting as a magnetic member, creates a south magnetic pole at the upper tip of the movable swinger 11. As is well known, the mutual repulsion of two south magnetic poles (in this case, one provided by the polarizing magnet 13 and the other located at the upper end of the swinger 11) will cause the swinger 11 to break its contact with the pole piece 13A and proceed through the similarly well-known mutual attraction between opposite magnetic poles (such as the north magnetic pole of polarizing magnet 12 and the pole created at the upper end of swinger 11), so that the swinger 11 shortly thereafter makes contact with pole piece 12A. The transferreed binary cell is now in the set state, the complement of the switching configuration actually shown in FIG. 1.

The process whereby the transferreed binary cell is reset is operationally quite similar to the setting process. When the next or reset pulse appears on the input lead 17, it proceeds through the conductive path provided by the swinger 11 through the extended portion of polarizing magnet 12 and to the reset winding 18 over the conductor 19. The reset winding 18 is arranged to receive input pulse current in a direction opposite to that offered by the set winding 15. In other words, looking at the transferreed binary cell of FIG. 1 as if from a top view in conjunction with the previous assumption, input pulses enter reset winding 18 from conductor 19 and proceed through this winding in a clockwise direction. An application of the right-hand rule will readily indicate that the electromagnetic field produced by pulse current passing through the reset winding 18 is in the downward direction as shown in the first row of column D in FIG. 2. Once again, the field due to the pulse current controls the magnetization directions in both the remanent sleeve 14 and in the swinger 11 during the reset pulse's duration.

Commencing with the termination of the reset pulse, the controlling effect priorly exerted by the magnetic field created by the pulse passing through the winding 18 no longer exists, and the magnetization direction in the swinger 11 is controlled now by the flow of magnetic flux from the remanent sleeve 14. This completes the analysis, returning to the beginning of the cycle wherein it was explained that as shown in column A of FIG. 2, the magnetization direction in the sleeve 14 provides magnetic flux flow through the air path and upward through the swinger 11. Such flow creates a north magnetic pole at the upper end of the swinger 11, causing the repulsion between the upper end of the swinger and the polarizing magnet 12 to break the contact of the swinger with the pole piece 12A. Similarly, once such contact has been broken, the swinger 11 proceeds under the magnetic control provided by the mutual attraction between the south magnetic pole of the magnet 13 and the north magnetic pole established at the upper end of swinger 11. The swinger thereby makes contact with the pole piece 13A and the switching cycle is complete, the transferreed binary cell having returned to the configuration represented in FIG. 1.

With reference to FIG. 3, a symbolic representation of the transferreed binary cell of FIG. 1 is shown. The method of representation is that discussed, for example, in the article "Pulse-Switching Circuits Using Magnetic Cores," by M. Karnaugh in volume 43 of the Proceedings of the IRE (May 1955). In said article, at page 572, the so-called "mirror symbols" now being utilized advantageously in the magnetic core art are described. Applied to the transferreed, the remanent magnetic sleeve 14 is represented by the heavy vertical line 34 in FIG. 3. The various leads and conductors of FIG. 1 are represented by similarly shown lines in FIG. 3; for example, the conductor 19 of FIG. 1 is shown as conductor 39 of FIG. 3, and the conductor 16 of FIG. 1 is represented by conductor 36 of FIG. 3. Under the principles of mirror symbology, windings are represented by 45° "mirrors" located at the intersection of the heavy vertical lines representing the remanent magnetic portion and the thinner conductor lines. The magnetic field sense or orientation is determined by "reflecting" the current which is producing that field into the winding mirror symbol. Thus, for example, the reset winding 18 of FIG. 1, shown as winding 38 in FIG. 3, produces a downward magnetic field when current passes from conductor 39 through the winding 38 from left to right as shown in FIG. 3. Similarly, the passage of current on conductor 36 through the set winding 35 of FIG. 3 produces an upward magnetic field direction. The polarizing magnets 12 and 13 of FIG. 1 are represented in FIG. 3 by the symbolic arrows 32 and 33 respectively; the arrows are shown pointing in a direction consistent with the assumptions supra as to show the direction of magnetic flux passing from south to north within a magnetic member. Finally, the two positions of the swinger 11 are represented in FIG. 3 by the make contact 31–1 and by the break contact 31–2. The transferreed binary cell of FIG. 3 is assumed to be normally in the reset condition, this condition exhibiting a closed break contact 31–2 and an open make contact 31–1.

The electrical switching operation of the cell shown in FIG. 3 is completely analogous to that described with reference to FIG. 1 supra. The transferreed cell of FIG. 3 is initially assumed to be in the reset condition wherein make contact 31–1 is open and break contact 31–2 is closed; in accordance with the technique adopted in connection with the mirror symbols cited supra, an upwardly directed magnetic field such as that created when pulse current passes from conductor 36 through winding 35 to ground at terminal 30, tends to close the make contact 31–1 and to open the break contact 31–2, thereby establishing the set state of the cell of FIG. 3. Similarly, a downwardly directed magnetic field such as that created when current passes from conductor 39 through winding 38 to ground at terminal 30, tends to reset the transferreed by closing the break contact 31–2 and opening the make contact 31–1, thereby returning the transferreed to the reset state assumed to be shown in FIG. 3.

When an input pulse arrives on input lead 37 with the transferreed of FIG. 3 in the reset state, the pulse passes to ground at terminal 30 through the path which includes closed break contact 31–2, conductor 36 and set winding 35. Since such a pulse, in passing through set winding 35, creates an upward magnetic field according to the mirror symbols assumptions supra, the responsive contacts (such contacts actually representing the two possible positions of the swinger 11 of FIG. 1) operate so as to open the priorly closed break contact 31–2 and to close the priorly open make contact 31–1. Due to the interaction of the various magnetic fields described with relation to FIG. 1, and whose direction as shown in the table of FIG. 2, contacts 31–1 and 31–2 do not commence any movement until after the input pulse has terminated. In fact, it may be said that the trailing edge of the input pulse initializes the operation of the contacts, so that until the trailing edge has occurred, no such operation can start. Thus, no problem of contacts breaking pulse currents will be encountered with the instant invention.

With the transferreed now in its set state, the next input pulse on lead 37 will be transmitted to ground at terminal 30 over the path which includes closed make contact 31–1, conductor 39 and reset winding 38. Again, in accordance with the assumptions made supra, such pulse current transmission "reflected" into the "mirror" represented by reset winding 38 creates a downward magnetic field in the transferreed, thereby, when the input pulse has terminated, causing closed make contact 31–1 to open and also causing open break contact 31–2 to close. This returns the transferreed binary cell of FIG. 3 to the reset condition assumed to be shown in FIG. 3 and completes the binary switching cycle.

In the prior art, the problem of obtaining effectively isolated output indications of the state of a magnetically controlled switching device through the use of only a single transfer contact which must also serve for steering purposes, was often troublesome. This problem is overcome in one schematic embodiment of the present invention as shown in FIG. 4. Therein is disclosed a transferreed binary cell whereby both pulse steering and read out are accomplished through the use of a single transfer contact (41–1, 41–2).

The transferreed binary cell with provision for output indication of FIG. 4 is based on the symbolic transferreed disclosed in relation to FIG. 3. In FIG. 4 are shown the heavy vertical line 44 representing the remanent magnetic sleeve of the transferreed in accordance with the mirror symbology cited supra, as well as the set winding 45, the reset winding 48, conductors 46 and 49, the ground connection at terminal 40, the input lead 47, the two arrows 42 and 43 representing the transferreed's polarizing magnets, and the make contact 41–1 and the break contact 41–2 representing the two possible positions of the transfer contact, such positions being analogous to the two possible positions of the swinger 11 of FIG. 1.

The switching cycle of the transferreed binary cell shown in FIG. 4 is identical to that described supra with relation to FIG. 3; the differences between FIG. 4 and FIG. 3 arise only with respect to the provision of an output indication of the state of the cell. If it is again assumed that the transferreed binary cell is in the reset condition in FIG. 4, make contact 41–1 will be open, while break contact 41–2 will be closed. Assuming that what is desired is a "single-rail" output indication, resistor 26 can be regarded as the load resistor through which such output signals will be transmitted only when make contact 41–1 is closed. That is, such a "single-rail" output indication will only obtain when the transferreed binary cell of FIG. 4 is in the set state, no such output indication being exhibited across the load resistor 26 when the transferreed binary cell is in the reset state, due to the open condition of contact 41–1.

The read out process when the transferreed binary cell is in the reset state is, it will be recalled, such that no output indication is displayed across load resistor 26 (i.e., the absence of such an output indication will show that the binary cell is in fact in the reset state). However, it is noted that a D.-C. path between the ground at terminal 40 and the positive potential source 21 exists even when the transferreed of FIG. 4 is reset, such path including source 21, resistor 22, closed break contact 41–2, conductor 46, set winding 45, resistor 25, conductor 27 to ground at terminal 40. Since the D.-C. levels for output purposes are maintained at a level which is appreciably lower than the pulse current levels (e.g., ampere-level currents for the latter and milliampere levels for the former), the magnetic states of the cell are unaffected by such D.-C. currents passing through the transferreed's windings. (The source 20 is advantageously arranged to have a relatively high "off" impedance, so as not to disturb the D.-C. read out). Thus, even though D.-C. current passes through set winding 45 from left to right as shown in FIG. 4 when the transferreed is in the reset condition, such transmission will not affect the direction of magnetization priorly established in the transferreed by signals from the input pulse source 20. The resistor 25 is provided as a "dummy" load resistor to protect the set winding 45 from excess D.-C. currents; it is evident that if a "double-rail" output is desired, both resistors 25 and 26 may be used as loads therefor.

When the transferreed binary cell of FIG. 4 has switched to the set state, however, it can be seen that the priorly recited ouput indicating means are effective to provide an output signal across load resistor 26. Make contact 41–1 is closed and break contact 41–2 is complementarily opened when the transferreed is in the set state, and a similar D.-C. current path can be traced from source 21, over resistor 22, closed make contact 41–1, conductor 49, reset winding 48, conductor 28 and resistor 26 to ground at terminal 40. Therefore, under these circumstances, an electrical output across resistor 26 will appear as an indication that the transferreed binary cell of FIG. 4 has switched to the set state. Since the load resistor 26 may advantageously represent any appropriately connected device such as an oscilloscope or a relay, arrangements embodying the principles of this invention can readily be devised utilizing this output signal. Once again, due to the relative amplitudes of the pulse and D.-C. output signals, the passage of D.-C. current through the reset winding 48 has no effect on the priorly established magnetic directions in the transferreed. The capacitors 23 and 24 provide low impedance paths to ground at terminal 40 for the set pulse and the reset pulse respectively thereby diverting these pulses away from the load resistors. Thus, it can be seen that a set pulse will pass from input pulse source 20 over input conductor 47 through closed break contact 41–2, conductor 46, set winding 45, and through the low impedance represented by the serial connection of capacitor 23 and conductor 27 to ground at terminal 40. Similarly, an input reset pulse from source 20 will proceed over input conductor 47 through closed make contact 41–1, conductor 49, reset winding 48, and through the low imepdance path represented by the serial connection of conductor 28 and capacitor 24 to ground at terminal 40.

In connection with an important feature of this invention pointed out supra, the contacts 41–1 and 41–2, symbolic of the two possible positions of a transferreed's swinger, do not commence to open or close until the input pulse from source 20 has terminated. Due to the controlling magnetic effects of an input pulse peculiar to this invention and described with relation to FIG. 1, the contacts 41–1 and 41–2 remain in their prior positions for the entire duration of such a pulse. The closed contact (41–1 when the cell is set and 41–2 when the cell is reset) thereby steers input pulses to subsequently alter its own position after the remanent magnetic member (e.g., element 44 in FIG. 4) has changed states in response to the appropriate winding's excitation effect. Furthermore, this feature enhances contact life by advantageously avoiding opening or closing the transferreed's transfer contact (i.e., the swinger 11 of FIG. 1, represented by the contacts 41–1 and 41–2 in FIG. 4) while relatively heavy pulse currents are passing therethrough.

It is to be understood that the above-described arrangements are illustrative of the application of the principles of the invention. Numerous other arrangements may be devised by those skilled in the art without departing from the spirit and scope of the invention.

What is claimed is:

1. A switching element responsive to input signals comprising movable conducting means, means for establishing a magnetic field around said movable conducting means, means responsive to the transmission of said signals through said conducting means for generating a magnetic field in a first direction in said conducting means for the duration of said signals, and magnetic means substantially enclosing said conducting means for generating a magnetic field in a second direction in said conducting means only in response to the termination of said signals and independently of the duration thereof to alter the position of said movable conducting means.

2. A switching element responsive to input pulses comprising contact means, means for establishing a magnetic field around said contact means, a plurality of windings responsive to said pulses having been steered thereto by said contact means for generating a first magnetic field in said contact means for the duration of said pulses, and magnetic means adjacent said windings for generating a second magnetic field in said contact means only in response to the trailing edge and independently of the duration of said pulses to change the position of said contact means.

3. A switching element responsive to input signals comprising movable steering means, means for establishing a magnetic field around said movable steering means, a plurality of windings responsive to said signals selectively steered thereto by said movable steering means for establishing a magnetic field in a first direction in said movable steering means for the duration of said signals, and magnetic means adjacent said windings and initially responsive to the passage of said signals through said windings for reinforcing said field in said first direction and responsive only to the termination of said signals and independently of the duration thereof for altering the position of said steering means.

4. A switching element responsive to input signals comprising first and second magnetic means, movable conducting means movable between said first and said second magnetic means, remanent magnetic means enclosing said movable conducting means, and winding means surrounding said remanent magnetic means and responsive only to the termination of each of said input signals selectively steered to said winding means through said movable conducting means for selectively altering the position of said movable conducting means independently of the duration of said input signals.

5. A switching element in accordance with claim 4 wherein said first and said second magnetic means each includes permanent magnet means.

6. A switching device responsive to input pulses comprising an envelope, remanent means enclosing said envelope, armature means within said envelope, and first and second winding means surrounding said remanent means responsive to selected one of said pulses for selectively generating magnetic fields in said remanent means and said armature means and for altering the position of said armature means only after the termination of each of said pulses and independently of the duration thereof when said fields in said remanent means and in said armature means are oppositely directed.

7. A switching device responsive to input pulses comprising first and second magnetic means, movable conducting means, remanent magnetic means enclosing said conducting means, and first winding means and second winding means surrounding said remanent means and responsive to each of said pulses selectively steered to said winding means through said movable conducting means for establishing magnetic fields in said movable conducting means and in said remanent means and for altering the position of said movable conducting means from a position contiguous to said first magnetic means to a position contiguous to said second magnetic means only after the trailing edge of each of said pulses and independently of the duration thereof only when said fields in said movable conducting means and in said remanent means are oppositely oriented.

8. A magnetically controlled switch responsive to input signals comprising first and second magnetic means, conductive commutating means transferable between said first and second magnetic means, first winding means and second winding means responsive to selected ones of said input signals for establishing a first magnetic field and a second magnetic field respectively in said conductive commutating means only for the duration of said signals, and remanent means adjacent said winding means and substantially enclosing said conductive commutating means for controlling said magnetic field in said conductive commutating means only after the termination of said signals and independently of the duration thereof by the flow of the magnetic flux from said remanent means through said conductive commutating means to alter the position of said commutating means.

9. A magnetic binary cell comprising a source of input pulses of a first amplitude, first and second permanent magnetic means, a plurality of windings responsive to the passage of said input pulses therethrough to selectively establish first and second oppositely directed magnetic fields, remanent magnetic means adjacent said windings responsive to the passage of said pulses through said windings, transfer contact means for selectively assuming one of a first and a second configurations contiguous to said first and second permanent magnetic means respectively in response to the flow of magnetic flux therethrough from said remanent magnetic means only after the termination of each of said input pulses and independently of the duration thereof and for thereafter steering subsequent ones of said input pulses to selected ones of said windings, and output means for providing an external indication of the said selectively assumed configurations of said contact means.

10. A cell in accordance with claim 9 wherein said output means includes potential means, and impedance means for providing a conduction path for current of a second relatively lower amplitude from said potential means through selected ones of said windings and selectively through said first and said second configurations of said contact means.

11. A cell in accordance with claim 10 including in addition reference potential means, and wherein said impedance means includes a plurality of capacitors, each of said capacitors providing an electrical path to said reference potential means from respective ones of said windings for said input pulses passing through selected ones of said windings.

12. A magnetic binary cell responsive to input signals comprising first and second permanent magnets, conductive switching means movable between said first and second permanent magnets, first and second winding means responsive to selected ones of said pulses for establishing a dominant magnetic field in a first and a second direction respectively in said cell for the duration of each of said selected ones of said pulses, and remanent magnetic means adjacent said winding means and substantially enclosing said conductive switching means responsive to the establishment of said dominant field for reversing the magnetic field in said conductive switching means after the cessation of said dominant field only in response to the trailing edge of each of said pulses and independently of the duration thereof to alter the position of said conductive switching means.

References Cited by the Examiner

UNITED STATES PATENTS

| | | | |
|---|---|---|---|
| 2,245,391 | 6/1941 | Dickten | 179—27.54 |
| 2,415,691 | 2/1947 | Huetten | 200—90.1 X |
| 2,483,723 | 10/1949 | Burton | 200—87 X |
| 2,782,325 | 2/1957 | Nilssen | 307—88 |
| 2,802,078 | 8/1957 | Martin. | |
| 3,008,021 | 11/1961 | Pollard | 200—93.4 |

NEIL C. READ, *Primary Examiner.*

P. XIARHOS, *Assistant Examiner.*